E. T. COLBURN.
Car Starter.
No. 70,528.
Patented Nov. 5, 1867.
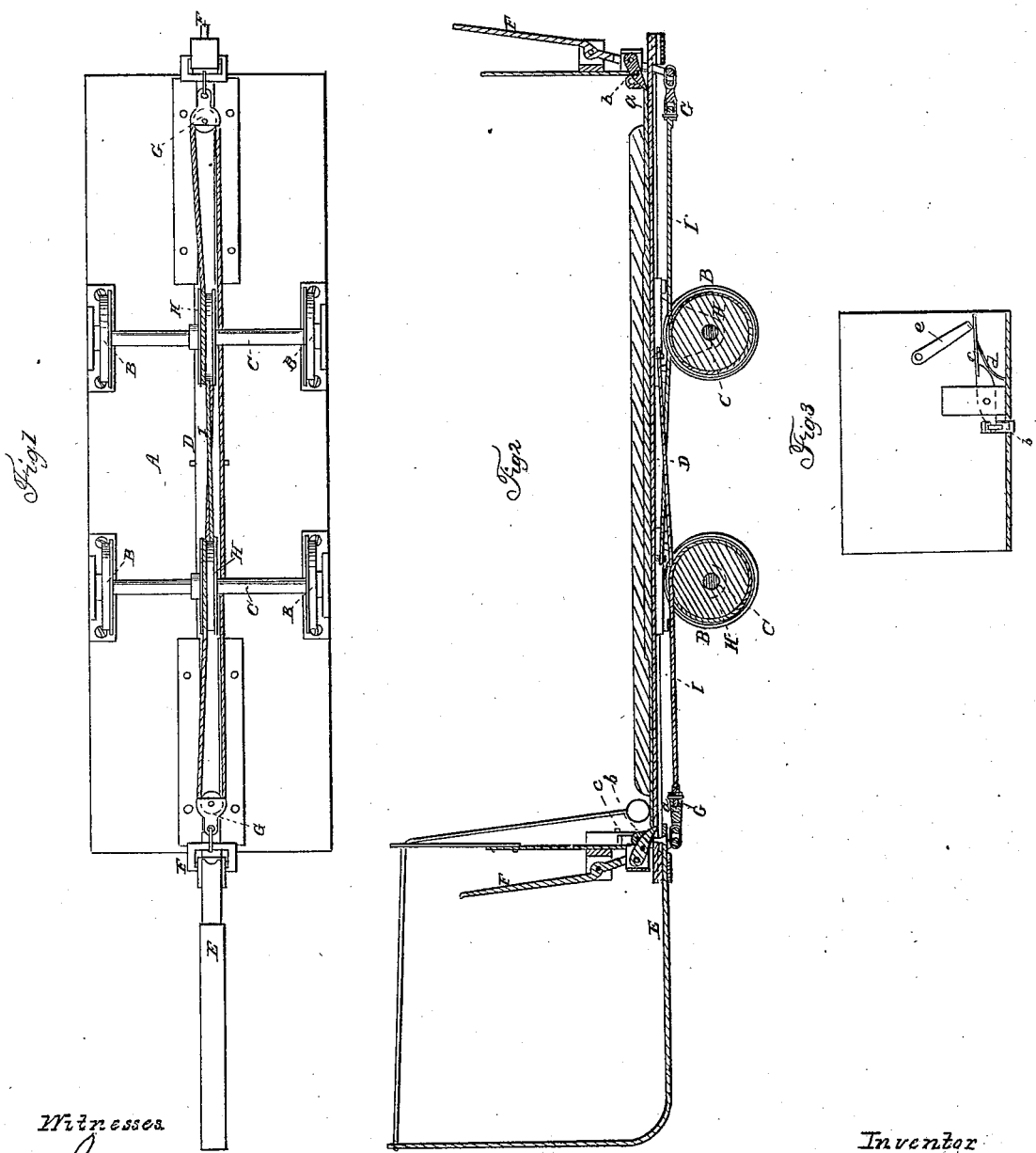

United States Patent Office.

ELISHA T. COLBURN, OF BOSTON, MASSACHUSETTS.

Letters Patent No. 70,528, dated November 5, 1867.

IMPROVED METHOD OF STOPPING AND STARTING CARS.

The Schedule referred to in these Letters Patent and making part of the same.

TO ALL PERSONS TO WHOM THESE PRESENTS SHALL COME:

Be it known that I, ELISHA T. COLBURN, of Boston, in the county of Suffolk, and State of Massachusetts, have invented a new and useful Mechanism for Stopping and Starting a Railway Carriage; and I do hereby declare the same to be fully described in the following specification, and represented in the accompanying drawings, of which—

Figure 1 is an under side view, and

Figure 2 a longitudinal section of a railway carriage provided with my invention.

In such drawings A denotes the body, B B B B the wheels, and C C the axles of a car or carriage, such, for instance, as one employed on street or horse-railways. Underneath the body of the vehicle is a long bar, D, so applied to the said body as to be capable of being slid or moved longitudinally under it. At each of its ends the bar D has a socket, or equivalent device, to receive a draw-bar or tongue, E, for connecting the draught-animals with the carriage. Furthermore, the said bar D has two notches, $a\ a$, made in it to receive two pawls, $b\ b$, hinged to the body, and arranged as represented in fig. 2. Each of these pawls is provided with a foot-lever, $c$, for raising it, such foot-lever being applied to the end of the body, or arranged therewith, as shown in fig. 3. A spring, $d$, under the longer arm of the lever, serves to raise it. A swing-bar, $e$, attached to the body, operates, when in a vertical position, to keep the pawl out of its notch. The pawl and notch are to prevent the bar D from being moved, except when it may be desirable to move it by the draw-bar. A lever, F, applied to each end of the body, or arranged therewith, as shown in the drawings, has a block or pulley, G, attached to its lower end. On each of the axles C, and beneath the bar D, a wheel, H, is fastened to and concentric with the axle. A rope, I, secured at one end to one of two studs, $f\ g$, projecting from the bar D, is carried over around the periphery of one of the wheels H, thence is passed through the next adjacent block G, or around the sheave thereof. Next it is carried by the two wheels H, to and around the other block, G, after which it is wound around the next adjacent wheel H, and from thence it passes to and is fastened to the other of the two studs $f\ g$, the whole being as shown in the drawings.

By laying hold of the longer arm of either lever, F, and pulling it toward the car body, the rope I will be drawn tightly on the two wheels H, and by its friction thereon, while they may be in revolution, will serve as a brake to check the movement of the carriage. By throwing the retaining-pawl $b$ out of its notch, so as to allow the bar D to be moved independently of the carriage body, the rope will be tightened on the wheels H, and drawn through the blocks in such manner as to produce a rotary motion of both wheels H, and cause the axles to revolve and turn the wheels B, so as to drive the car ahead. The car will thus be started with a power increased beyond that ordinarily applied to it by the draught-animals, for, instead of the force being exerted directly at the axle, it will act thereon through the leverage of the radius of the wheel H. Thus the power exerted by the horses to start the car will be applied with a greater useful effect by means of the slide-bar, the rope, and the wheels applied to the car and its draw-bar, as described.

In case of the employment of the brake mechanism without the slide-bar D, the rope, instead of being wound about both wheels H, will go around but one of them.

I claim as my invention the following, that is to say—

The combination of the slide-bar D and its locking pawls, with the brake mechanism, consisting of the levers F, the blocks G, the rope I, and the wheel or wheels H, the whole being substantially as specified.

I also claim, as an accelerating mechanism for a car, the combination of the slide-bar D, the rope I, and the wheel or wheels H, arranged and applied to the axles as set forth, the said bar D being connected to the draw-bar or tongue of the car, as explained:

E. T. COLBURN.

Witnesses:
R. H. EDDY,
F. P. HALE, Jr.